US008873615B2

(12) United States Patent
Hui et al.

(10) Patent No.: US 8,873,615 B2
(45) Date of Patent: Oct. 28, 2014

(54) METHOD AND CONTROLLER FOR EQUALIZING A RECEIVED SERIAL DATA STREAM

(71) Applicant: Avago Technologies General IP (Singapore) Pte. Ltd., Singapore (SG)

(72) Inventors: David Chak Wang Hui, Santa Clara, CA (US); Xiaozhong Wang, Cupertino, CA (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 78 days.

(21) Appl. No.: 13/622,508

(22) Filed: Sep. 19, 2012

(65) Prior Publication Data
US 2014/0079111 A1 Mar. 20, 2014

(51) Int. Cl.
*H03H 7/40* (2006.01)
(52) U.S. Cl.
USPC ............................................. 375/234; 375/350
(58) Field of Classification Search
CPC .................. H04L 25/03057; H04L 2025/0349; H04L 25/03267; H04L 2025/03617; H04L 27/01; H04L 25/03885; H04L 25/03949; H04L 2025/03503; H04L 25/03044
USPC ................... 375/229–234, 346, 350
See application file for complete search history.

(56) References Cited

U.S. PATENT DOCUMENTS

| | | | | |
|---|---|---|---|---|
| 5,157,395 A * | 10/1992 | Del Signore et al. | ......... | 341/143 |
| 5,428,605 A * | 6/1995 | Andre | ........................... | 370/290 |
| 5,596,677 A * | 1/1997 | Jarvinen et al. | ............... | 704/220 |
| 5,774,564 A * | 6/1998 | Eguchi et al. | ............... | 381/71.11 |
| 5,815,496 A * | 9/1998 | Flanagan et al. | ............... | 370/287 |
| 5,841,810 A * | 11/1998 | Wong et al. | .................... | 375/232 |
| 5,864,798 A * | 1/1999 | Miseki et al. | .................. | 704/225 |
| 6,009,083 A * | 12/1999 | Flanagan et al. | ............... | 370/287 |
| 6,061,008 A * | 5/2000 | Abbey | .......................... | 341/143 |
| 6,195,383 B1 * | 2/2001 | Wishart et al. | ................ | 375/136 |
| 6,212,144 B1 * | 4/2001 | Asano | ........................ | 369/47.25 |
| 6,347,123 B1 * | 2/2002 | Mathe et al. | .................. | 375/324 |
| 6,445,735 B1 * | 9/2002 | Whikehart | .................... | 375/232 |
| 6,804,695 B1 * | 10/2004 | Hsu | .............................. | 708/322 |

(Continued)

OTHER PUBLICATIONS

Swenson et al., Standards Compliance Testing of Optical Transmitters Using a Software-Based Equalizing Reference Receiver, 2007, ClariPhy Communications Inc., Irvine, CA, U.S.A. available at http://www.clariphy.com/pdfs/OFC2007.pdf.

(Continued)

*Primary Examiner* — Emmanuel Bayard

(57) ABSTRACT

A controller and methods for adaptively adjusting a dispersion compensation circuit in a receiver of a communication link are disclosed. The controller receives a signal from an error detector coupled to the receiver. The controller includes a logic engine that provides configuration information to the dispersion compensation circuit. The configuration information defines a digital filter in response to at least one tap constraint and at least one coefficient constraint. In an example embodiment, the logic engine generates a measure of residual inter-symbol interference and a measure of a noise enhancement penalty and iteratively provides a set of adjusted coefficient values that when applied in the digital filter will result in an equalized receiver output signal that minimizes a mathematical combination of the measure of the residual inter-symbol interference and the measure of the noise enhancement penalty. Alternatively, for bandwidth limited channels, the controller provides a predetermined set of coefficient values.

20 Claims, 12 Drawing Sheets

(56) References Cited

U.S. PATENT DOCUMENTS

| | | | |
|---|---|---|---|
| 6,873,704 B1* | 3/2005 | Park | 379/406.08 |
| 6,947,497 B1* | 9/2005 | Ahn | 375/326 |
| 7,099,822 B2* | 8/2006 | Zangi | 704/226 |
| 7,149,474 B1* | 12/2006 | Mikhak | 455/41.2 |
| 7,293,055 B2* | 11/2007 | McAdam et al. | 708/322 |
| 7,548,726 B1* | 6/2009 | Rofougaran | 455/20 |
| 7,664,394 B2 | 2/2010 | Lindsay et al. | |
| 7,778,323 B1* | 8/2010 | Nodenot et al. | 375/233 |
| 7,872,679 B2* | 1/2011 | Hara | 348/247 |
| 7,894,515 B2* | 2/2011 | Kuijk et al. | 375/232 |
| 8,300,744 B2* | 10/2012 | Kim et al. | 375/346 |
| 8,306,430 B2* | 11/2012 | Miura et al. | 398/147 |
| 8,478,137 B2* | 7/2013 | Komaki et al. | 398/208 |
| 2002/0051502 A1* | 5/2002 | Mathe | 375/316 |
| 2002/0132590 A1* | 9/2002 | Marshall | 455/73 |
| 2003/0016605 A1* | 1/2003 | Tateyama et al. | 369/47.26 |
| 2003/0053243 A1* | 3/2003 | Kubota et al. | 360/75 |
| 2004/0018825 A1* | 1/2004 | Wagner et al. | 455/307 |
| 2004/0114936 A1* | 6/2004 | Sugihara et al. | 398/147 |
| 2004/0141756 A1* | 7/2004 | Nakamura et al. | 398/147 |
| 2004/0152418 A1* | 8/2004 | Sinha et al. | 455/42 |
| 2004/0179849 A1* | 9/2004 | Miyazaki | 398/147 |
| 2004/0199559 A1* | 10/2004 | McAdam et al. | 708/322 |
| 2005/0207515 A1* | 9/2005 | Jensen et al. | 375/327 |
| 2006/0067699 A1 | 3/2006 | Chandrasekhar et al. | |
| 2006/0140262 A1* | 6/2006 | Kuijk et al. | 375/232 |
| 2006/0198464 A1* | 9/2006 | Sasaki et al. | 375/296 |
| 2007/0110199 A1* | 5/2007 | Momtaz et al. | 375/350 |
| 2007/0297804 A1* | 12/2007 | Honda et al. | 398/147 |
| 2008/0025730 A1* | 1/2008 | Giovannini et al. | 398/147 |
| 2008/0036883 A1* | 2/2008 | Hara | 348/246 |
| 2008/0107166 A1* | 5/2008 | Lee | 375/232 |
| 2008/0137778 A1* | 6/2008 | Makimoto et al. | 375/330 |
| 2008/0167793 A1* | 7/2008 | Kaneko et al. | 701/114 |
| 2008/0187323 A1* | 8/2008 | Honda et al. | 398/159 |
| 2008/0279563 A1* | 11/2008 | Shu | 398/147 |
| 2008/0310855 A1* | 12/2008 | Ogawa et al. | 398/147 |
| 2009/0047025 A1 | 2/2009 | Hong et al. | |
| 2009/0067559 A1* | 3/2009 | Azazzi et al. | 375/348 |
| 2009/0067783 A1* | 3/2009 | Webb et al. | 385/27 |
| 2009/0116844 A1* | 5/2009 | Tanaka et al. | 398/115 |
| 2009/0190646 A1* | 7/2009 | Ooi | 375/232 |
| 2009/0221254 A1* | 9/2009 | Kawauchi et al. | 455/296 |
| 2009/0238563 A1* | 9/2009 | Fukashiro et al. | 398/30 |
| 2009/0296798 A1* | 12/2009 | Banna et al. | 375/229 |
| 2009/0315871 A1* | 12/2009 | Kobayashi | 345/208 |
| 2009/0317079 A1* | 12/2009 | Yoshida | 398/29 |
| 2009/0317092 A1* | 12/2009 | Nakashima et al. | 398/204 |
| 2010/0054759 A1* | 3/2010 | Oda et al. | 398/202 |
| 2010/0067917 A1* | 3/2010 | Sakane et al. | 398/136 |
| 2010/0092185 A1* | 4/2010 | Nemoto | 398/208 |
| 2010/0124418 A1 | 5/2010 | Noble et al. | |
| 2010/0142946 A1* | 6/2010 | Liu et al. | 398/29 |
| 2010/0158537 A1* | 6/2010 | Murakami et al. | 398/159 |
| 2010/0247095 A1* | 9/2010 | Fujita et al. | 398/29 |
| 2010/0266134 A1* | 10/2010 | Wertz et al. | 381/71.1 |
| 2010/0278528 A1* | 11/2010 | Isomura et al. | 398/25 |
| 2010/0316112 A1* | 12/2010 | Huang et al. | 375/233 |
| 2010/0322630 A1* | 12/2010 | Takeuchi et al. | 398/65 |
| 2011/0052198 A1* | 3/2011 | Ohtani | 398/81 |
| 2011/0188854 A1* | 8/2011 | Honda | 398/38 |
| 2011/0293270 A1* | 12/2011 | Takeuchi et al. | 398/45 |
| 2011/0305453 A1* | 12/2011 | Hauske et al. | 398/38 |
| 2012/0020661 A1* | 1/2012 | Kaburagi et al. | 398/26 |
| 2012/0051754 A1* | 3/2012 | Sakamoto et al. | 398/115 |
| 2012/0148265 A1* | 6/2012 | Chang et al. | 398/208 |
| 2013/0016968 A1* | 1/2013 | Ohtani | 398/34 |

OTHER PUBLICATIONS

Breyer et al., Comparison of OOK- and PAM-4 Modulation for 10GBits/s Transmission Over Up to 300m Polymer Optical Fiber, 2008, available at http://w3.tue.nl/fileadmin/ele/TTE/ECO/Files/Pubs_2008/Breyer_Lee_OWB5.pdf.

* cited by examiner

| Waveform | Initial ISI | Full Optimized ||| Simplified ($C_1 = 0.377$ fixed) ||| Simplified, C1 optimized ||||
|---|---|---|---|---|---|---|---|---|---|---|
| | | Residual ISI | NEF | Net Gain | Residual ISI | NEF | Net Gain | $C_1$ | Residual ISI | NEF | Net Gain |
| A | 3.62 | 0.06 | 0.93 | 2.64 | 0.44 | 0.77 | 2.41 | 0.475 | 0.07 | 1.12 | 2.44 |
| B | 4.16 | 0.62 | 0.78 | 2.77 | 0.66 | 0.77 | 2.74 | 0.375 | 0.67 | 0.76 | 2.74 |
| C | 4.95 | 1.28 | 0.55 | 3.12 | 1.23 | 0.77 | 2.94 | 0.302 | 1.46 | 0.53 | 2.96 |
| D | 3.37 | 0.35 | 0.91 | 2.10 | 0.50 | 0.77 | 2.09 | 0.403 | 0.41 | 0.86 | 2.10 |
| E | 2.30 | -0.09 | 0.57 | 1.81 | 0.00 | 0.77 | 1.53 | 0.277 | 0.11 | 0.45 | 1.73 |

*FIG. 11*

METHOD AND CONTROLLER FOR EQUALIZING A RECEIVED SERIAL DATA STREAM

TECHNICAL FIELD

The invention relates to communications networks over which data is serially communicated in the form of time-varying signals transmitted and received over various data transmission media.

BACKGROUND

Digital communication receivers sample an incoming waveform and then reliably detect the sampled data. Typically, a receiver includes a Clock and Data Recovery (CDR) system to recover the clock and data from an incoming data stream. The CDR system generates a clock signal having the same frequency and phase as the incoming signal, which is then used to sample the received signal and detect the transmitted data.

The quality of the received signal is often impaired by inter-symbol interference, crosstalk, echo, and other noise. In addition, impairments in the receiver itself may further degrade the quality of the received signal. The received signal can be viewed as a well-known "data eye," which is a superposition of a number of impaired individual signals with varying frequency components, for example, due to ISI and other noise. As the various impairments increase, the quality of an eye diagram or eye trace derived from or otherwise detected by observation of the received signal is impaired.

An eye diagram corresponds to a superposition of samples of a serial data signal over a unit interval of the data signal (i.e., the shortest time period over which the data signal can change state). An eye diagram may be generated by applying the serial data signal to the vertical input of an oscilloscope and triggering a horizontal sweep across the unit interval based on the data rate of the serial data signal. When the serial data signal corresponds to a pseudorandom data signal, the superposed samples appear on the oscilloscope display as an eye diagram with an eye opening bounded by two transition regions. Various features of the eye opening reveal information about the quality of the communications channel over which the serial data signal is transmitted. For example, a wide eye opening indicates that the serial data signal has a relatively low noise level and a relatively low bit-error rate, whereas a narrow eye opening indicates that the serial data signal has a relatively high noise level and a relatively high bit-error rate.

"Eye margining" is a technique by which the height and width, or margins, of a data eye can be measured. The eye margin of a receiver can be evaluated following the manufacturing process, or prior to deployment in a given application, to determine if the receiver satisfies one or more predefined margin criteria. If the receiver does not satisfy the one or more predefined margin criteria, the device can be rejected or one or more device parameters can be modified and the margin criteria can be reevaluated. Eye margining is often performed using a classical jitter tolerance technique and eye histogram techniques.

An eye diagram typically is evaluated based on the width of the eye opening, the height of the eye opening, and the rate of closure of the eye opening with variation of the sampling time. The width of the eye opening corresponds to the time interval over which the serial data signal can be sampled without inter-symbol interference. The height of the eye opening corresponds to a measure of the signal-to-noise ratio of the serial data signal. The rate of closure of the eye opening with variation of the sampling time indicates the sensitivity of the serial data signal to timing errors.

Various eye margining or monitoring circuits have been developed that measure one or more characteristic features of an eye diagram of a serial data signal in real-time. The measured features typically are used to correct distortions that are introduced into the serial data signal by the communication channel. For example, the frequency responses of some adaptive equalizers are optimized based on measurements of signal quality as indicated by one or more characteristic eye diagram features.

It is well known in the communications industry that electronic dispersion compensation (EDC or also known as equalization) can be used to reduce the adverse effects due to bandwidth limitations introduced in the supporting electronics or in the data carrier media. For example, the Institute of Electrical and Electronics Engineers published Standard 802.3ak on Feb. 9, 2004 (IEEE 802.3ak). The IEEE 802.3ak standard defines the physical layer and the data link layer's media access control for wired 10 Gbps Ethernet. Specifically, 10 Gbps Ethernet over a twin-axial communication media (e.g., an InfiniBand cable type) over signal transmission distances up to 15 m. The IEEE 802.3ak standard calls for both transmitter pre-emphasis and receiver equalization to support signal transmissions over copper at these distances. EDC or equalization has been implemented using feed-forward equalizers and decision-feedback equalizers.

EDC has also been applied to fiber optical based communication links. The IEEE 802.3aq standard was developed using equalization to compensate for signal dispersion introduced by the fiber media. A conventional arrangement is illustrated in FIG. 1. A receiver 10 includes a detector 20 and a controller 22 in a feedback loop. An optical signal is received along an optical path 11 at a tunable optical dispersion compensator (ODC) 12. The tunable ODC 12 operates in accordance with a control signal generated in the controller 22 and communicated on connection 23. As described in U.S. Patent Application Publication No. 2006/0067699, this first control signal adjusts the ODC 12 to control first-order dispersion in an optical signal. An adjusted version of the received optical signal is forwarded to optional optical element(s) 14 (e.g., a filter, an amplifier) for additional optical signal processing. The optical signal emerging from optical path 15 is received by the photosensitive diode 16, which communicates an electrical signal responsive to the received optical signal on connection 17 to an electronic dispersion compensator (EDC) 18. The EDC 18 operates in accordance with a second control signal generated in the controller 22 and communicated on connection 25. As described in U.S. Patent Application Publication No. 2006/0067699, this second control signal adjusts the EDC 18 to compensate for higher-order dispersion present in the converted electrical signal. The adjusted electrical signal is forwarded on connection 19 to detector 20. The detector 20 may comprise any of a number of known signal detectors or systems for detecting electrical signal characteristics including anomalies in the adjusted electrical signal. An electrical quality signal is communicated from the detector 20 to the controller on connection 21. The controller 22 utilizes one or more characteristics of the electrical quality signal to separately and independently control the ODC 12 and the EDC 18.

In a conventional feed-forward equalizer (FFE) approach, a FFE circuit consists of digital filter with M taps, where M is a positive integer. Each tap is exposed to the received signal after a certain delay and amplifies the received signal in accordance with a tap coefficient ($C_i$) or weight factor. The output of the FFE circuit is the sum of all tap outputs. This FFE output is forwarded to an error detector, which is applied in a feedback loop to adjust the individual tap coefficients to reduce the magnitude of the error. EDC was considered for short distance multi-mode fiber optical communication links. For example, equalization was proposed as an option in 28 Gbps fiber channel links. However, EDC, as it is defined in the industry standard, is not very effective when applied to fiber-based communication links.

As an example, in the case shown below, the 28G fiber channel standard with EDC was applied to a fiber link operating at 20.625 Gbps. A measure of the inter-symbol interference (ISI) for the channel is defined by the ratio of the eye opening (at the center) and the maximum amplitude of the eye diagram. More specifically, ISI=10*log(eye_opening_center/amplitude_maximum). As indicated in FIG. 2A, the amplitude of the original eye opening is 0.55(arbitrary unit, or a.u.), while the eye diagram maximum amplitude is 1.0(a.u.). Thus, in the illustrated example, ISI is 10*log(0.55/1.0)=2.6 dB. That is, the original input eye has an ISI or vertical closure penalty of about 2.6 dB, not including the effect of the bandwidth of individual taps. In generating the illustrated results it was assumed that the receiver has 0.75×baud rate in bandwidth (with unit of Hz).

The signal plot presented in FIG. 2B reveals an equalized or adjusted eye diagram without normalization. It was assumed that each tap in the equalizer had a much higher bandwidth than the receiver, despite the fact that it is difficult to manufacture or obtain high bandwidth components. The system applied equalization by using a three-tap FFE EDC with a 1 unit interval (UI) tap delay. The UI is the minimum time between signal level changes of a data signal. The UI is also known as the pulse time or symbol duration. The UI, which for some serial data transmission protocols (e.g., non return to zero modulation) coincides with the bit time, is the time elapsed in transmitting one bit. UI is a dimensionless measure of a definite time based on the transmitted data rate. For example, in a serial data communication with a baud rate of 2.5 Gbps, the UI is 0.4 nSec/baud.

In the proposed 32G Fiber Channel standard the FFE EDC minimizes the mean square error in the output of the equalizer at the center of the eye. This approach forces the center of the eye to have minimum spread around each of the data "1" level or the data "0" level. The following tap weights were found to be optimum: −0.15, 1, and −0.15. After equalization, the eye had a residual ISI of 0.1 dB. However, the FFE EDC introduced an additional penalty of 1.65 dB due to noise enhancement. This noise enhancement penalty included contributions from two parts: a) increased noise from other taps and b) a decrease in the amplitude of the signal. Regarding the increase in noise, assuming original white noise of a, the new noise, $$\sigma New = \sigma \sqrt{\sum_i \left(\frac{C_i}{C_n}\right)^2}. \qquad \text{Equation (1)}$$

Here $C_n$ is the value of the reference tap weight and n is the location of the reference tap, and $C_i$ is the tap weight of the $i^{th}$ tap. In this example, $C_n=1$, n=2, and $C_i=-0.15$, 1, −0.15, respectively, for i=1, 2, 3.

This noise caused an additional noise penalty, $$P = 10\log\left(\frac{\sigma New}{\sigma}\right), \qquad \text{Equation (2)}$$

which is 0.10 dB based on tap weights of −0.15, 1, and −0.15.

For this example, the signal amplitude was also reduced from 1 to 0.70. Consequently, the reduction in signal amplitude actually caused 10*log(0.7/1)=1.55 dB in penalty. In summary, the total center of eye sensitivity penalty in the original unequalized eye is 2.6 dB. In contrast, the total center of eye penalty after equalization using a known standard is 0.10 (residual ISI)+1.55(amplitude reduction)+0.10 (noise increase)=1.75 dB, yielding a very small 0.85 dB gain as a result of the EDC.

SUMMARY

A controller adaptively adjusts a dispersion compensation circuit in a receiver of a communication link. The controller receives a signal from an error detector coupled to an output of the dispersion compensation circuit. The controller includes a logic engine coupled to the interface. The logic engine provides configuration information defining a digital filter in response to a tap constraint and a coefficient constraint. The logic engine generates a measure of residual inter-symbol interference (ISI) and a measure of a noise enhancement penalty and iteratively generates a set of adjusted coefficient values that when applied in the digital filter will result in an equalized receiver output signal that minimizes a mathematical combination of the measure of residual ISI and the measure of the noise enhancement penalty.

A method for adaptively equalizing a received serial data stream processed by a dispersion compensation circuit includes the steps of receiving a signal from an error detector responsive to an output of the dispersion compensation circuit, using a logic engine responsive to the signal from the error detector, a tap constraint, and a coefficient constraint, to generate and provide configuration information to the dispersion compensation circuit, using the logic engine to generate a measure of residual inter-symbol interference (ISI) in a receive signal adjusted with the dispersion compensation circuit, using the logic engine to generate a measure of noise enhancement penalty in the receive signal adjusted with the dispersion compensation circuit and iteratively generating a set of adjusted coefficient values that when applied in the dispersion compensation circuit will result in an equalized receiver output signal that minimizes a mathematical combination of the measure of the residue inter-symbol interference and the measure of the noise enhancement penalty.

A method for equalizing a received serial data stream processed by a dispersion compensation circuit, includes the steps of determining that a received signal is degraded due to a bandwidth limited communication channel and applying a set of coefficient values to the dispersion compensation circuit, the coefficient values generated as a function of a coefficient value for the adjacent taps to a reference tap, wherein a coefficient value associated with the reference tap is one.

These and other features and advantages of the method and apparatus will become apparent from the following description, drawings and claims.

BRIEF DESCRIPTION OF THE DRAWINGS

The controller and method for equalizing a received serial data signal can be better understood with reference to the following drawings. The components in the drawings are not necessarily to scale, emphasis instead being placed upon clearly illustrating the principles of the present invention.

FIG. 11 illustrates a table that reveals three measures for three alternative configurations of a dispersion compensation circuit.

DETAILED DESCRIPTION OF ILLUSTRATED EMBODIMENTS

Figure 1:
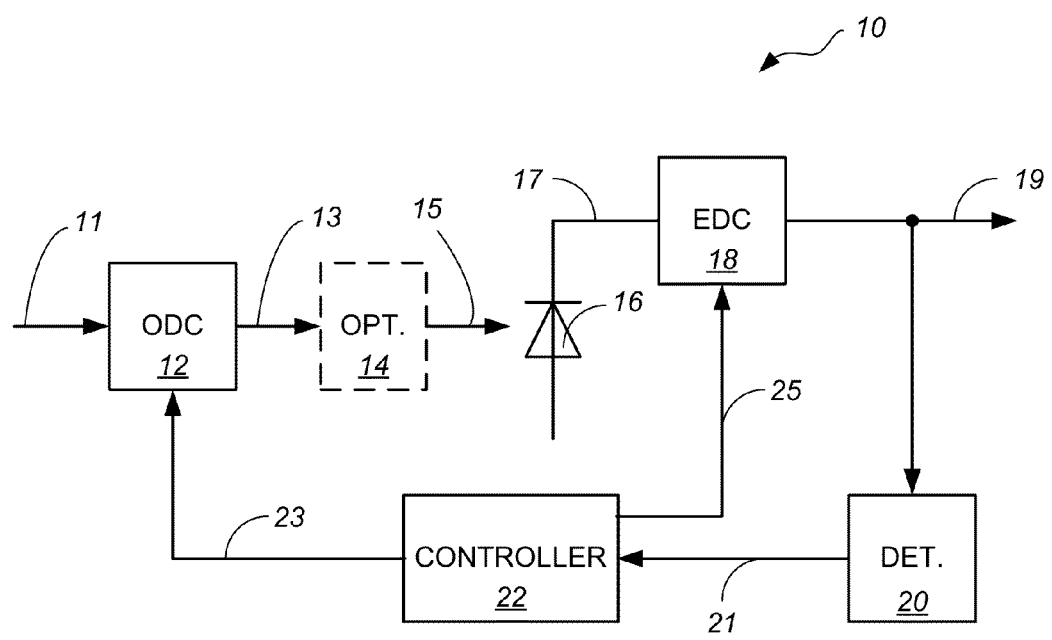
FIG. 1 illustrates a block diagram of an embodiment of a prior art equalizer.
Figure 2A:
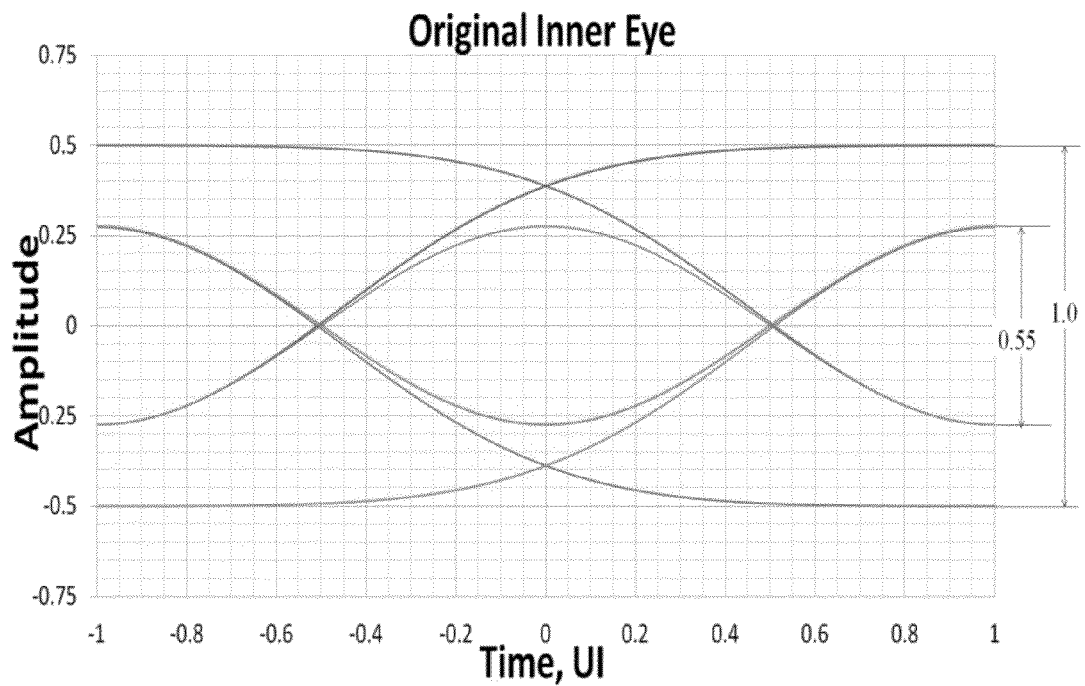
FIGS. 2A-2C include signal eye diagrams of an original received signal, an equalized signal using a prior art communication standard, and an equalized and normalized signal, respectively.
Figure 2B:
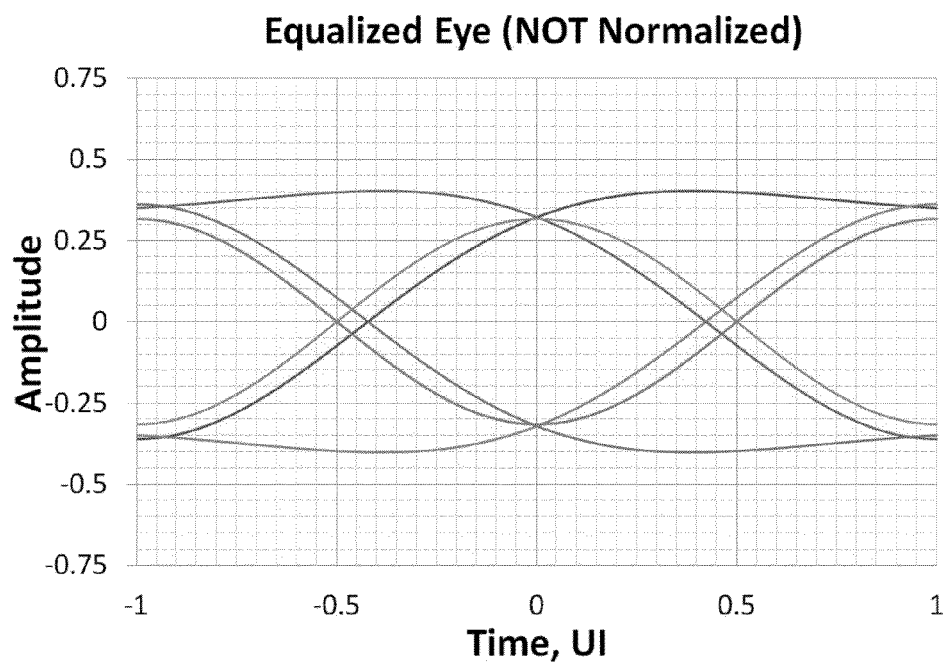
Figure 2C:
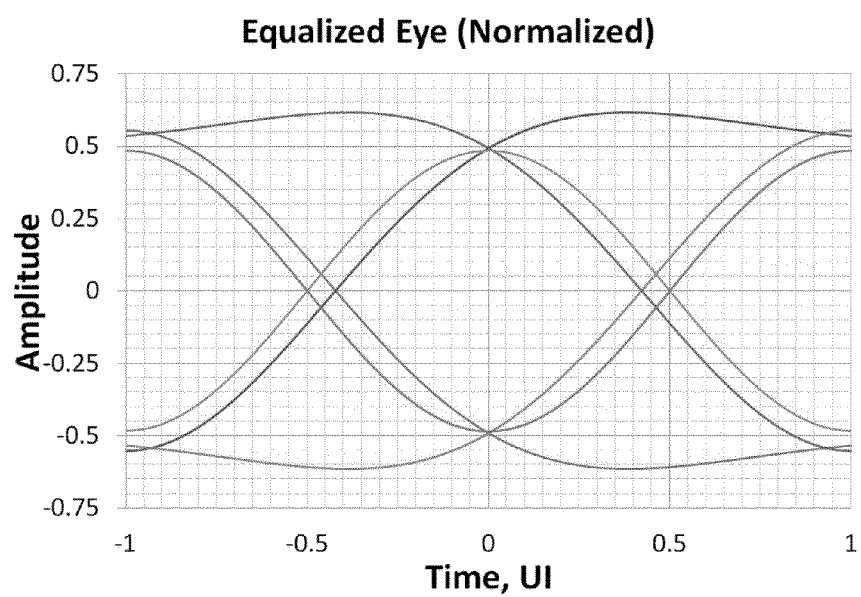

An apparatus and method for equalizing a received serial data signal uses non-traditional electronic dispersion compensation techniques applied to an electronic version of a data signal transmitted from a remote transmitter. The non-traditional electronic dispersion techniques include various improvements to a digital filter deployed in the channel receiver. For example, it is proposed that the digital filter be coupled with a controller programmed to adjust the tap coefficients and controllably deploy a fractional unit interval tap spacing over a total tap range of at least three unit intervals in response to a residual ISI and a noise enhancement penalty. Specifically, the controller is programmed to minimize the sum of the residual inter-symbol interference (ISI) and a noise enhancement penalty. The sum of the residual ISI and the noise enhancement penalty are more closely attributable to link performance than conventional EDC techniques, which force the residual ISI to zero.

By using fractional UI tap spacing, the two taps closest to a main or reference tap can be positive. That is, positive coefficient values can be associated with each of these taps to increase the amplitude of the signal. The remaining taps can be adjusted to reduce ISI. A main or reference tap can be located anywhere across the set of all taps. An asymmetric tap arrangement can be helpful in properly correcting received waveforms with any asymmetry. However, it is preferred that at least two precursor taps be allocated to provide sufficient receiver responsiveness.

The controller is arranged to provide a set of tap coefficients such that the sum of all tap coefficients normalized by a main or reference tap value is set to a value that approximates unity. For example, the sum of all tap coefficients can be constrained within a range of about 0.8 to 1.2. In this way, the overall amplitude of the received and corrected signal is not far from the original signal value. Within that constraint the coefficient values are manipulated to minimize the ISI. The constraints are implemented using digital control logic, which is effective in an automated scheme using mean square error as the figure of merit for making the adjustments. The constraints greatly reduce the range of possible solutions that an algorithmic approach need to apply to determine an optimal solution for present link conditions as manifested in the electronic representation of the received signal. The constraints also reduce the likelihood of the controller misidentifying local minimums that might not be associated with optimal link performance.

Furthermore, it has been determined that for communication channels where dispersion in the receiver is attributable solely to bandwidth limitations that a set of predetermined coefficient values can be used to configure a digital filter in the dispersion compensation circuit to effectively maximize the receive signal for received waveforms having inter-symbol interference from about 2 dB to 5 dB. Specifically, the set of coefficients can be defined as a function of a coefficient value for the adjacent taps to a reference, where a coefficient value associated with the reference tap is one and the coefficient values for the adjacent taps is about 0.38. In addition, the coefficient value for taps further removed from the reference tap is determined from the product of $-\frac{1}{2}$ and the coefficient value for the adjacent taps, or $-0.19$.

The disclosed features and advantages of the serial data monitor and method for quantifying characteristics of a serial data stream will now be described with reference to the illustrative, or exemplary, embodiments shown in FIGS. 3-11, in which like reference numerals represent like elements or features.

Figure 3:
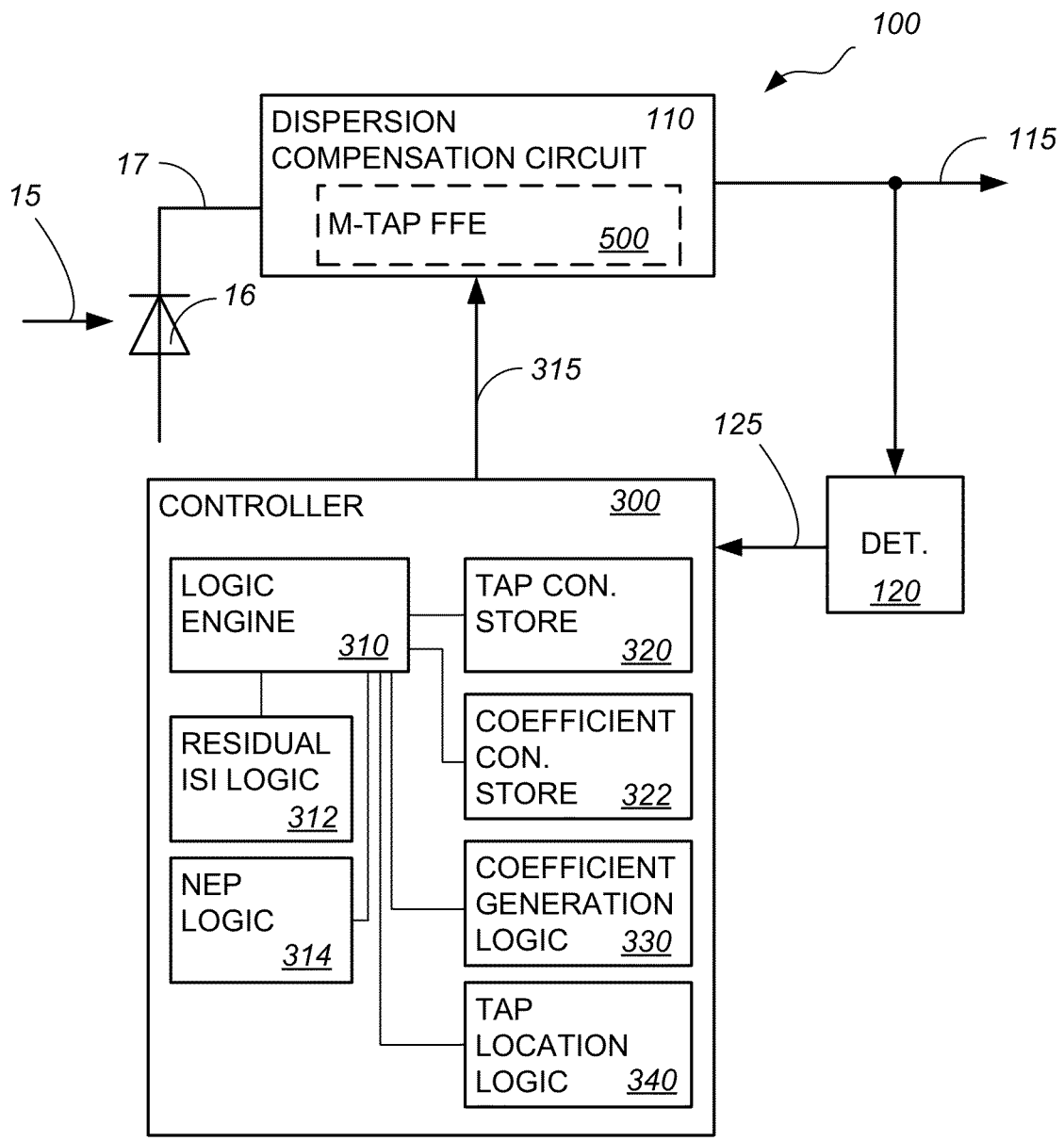
FIG. 3 illustrates a block diagram of an embodiment of an improved controller for adjusting a dispersion compensation circuit.

FIG. 3 illustrates a block diagram of an embodiment of an improved controller 300 for adjusting a dispersion compensation circuit 110. As shown in FIG. 3, the controller 300 receives a quality signal on connection 125 from the detector 120 and sends configuration information on connection 315 to the M-tap FFE of the dispersion compensation circuit 110 to adaptively modify the eye diagram of the received signal on connection 115. In a preferred embodiment, the quality signal is an error signal generated by a mean square error detector.

The improved controller 300 includes a logic engine 310, a tap constraint store 320, a coefficient constraint store 322, residual ISI logic 312, noise enhancement penalty (NEP) logic 314, coefficient generation logic 330, and tap location logic 340. In operation, the logic engine 310 or coordinating logic receives the quality signal via a suitable interface as well as information from the tap constraint store 320 and the coefficient constraint store 322 indicative of one or more tap constraints and one or more coefficient constraints that should be employed when generating configuration information. The configuration information generated and communicated by the logic engine 310 to the dispersion compensation circuit 110 defines characteristics of a digital filter. As will be described in association with the digital filters illustrated in FIG. 4 and FIG. 5, the digital filter can be implemented as an M-tap FFE, where M is a positive integer that identifies the number of taps present in the digital filter.

The logic engine 310 executes one or more executable instructions in the residual ISI logic 312 to generate a measure of ISI remaining in the received signal. In addition, the logic engine 310 executes one or more executable instructions in the NEP logic 314 to generate a measure of the additional noise present in the equalized or adjusted receive signal. Furthermore, the logic engine 310 executes one or more executable instructions in the tap location logic 340 in accordance with one or more tap constraints as provided from the tap constraint store 320 to identify suitable delay times that are communicated in the configuration information to the dispersion compensation circuit 110. Moreover, the logic engine 310 executes one or more executable instructions in the coefficient generation logic 330 in accordance with one or more coefficient constraints as provided from the coefficient constraint store 322 that when applied in the digital filter will result in an equalized receiver output signal that minimizes a mathematical combination of the measure of the residual ISI and the noise enhancement penalty. In turn, the identified coefficient values for the identified taps are also communicated in the configuration information to the dispersion compensation circuit 110.

The one or more tap constraints will identify a reference tap location, a tap interval and a total tap coverage as an integer multiple of a UI. Given this information, the tap location logic 340 can provide the necessary configuration information to the M-tap FFE in the dispersion compensation circuit. The total tap coverage is the product of the tap interval and the total number of taps less one. For communication links using optical media (e.g., fiber), a total tap coverage of at least 3UI is preferred. Additional tap constraints may include a range of acceptable tap intervals (e.g. from about 0.3UI to about 0.7UI).

It has been determined that a fractional tap interval of 0.5UI works well. Accordingly, it is preferred that the M-Tap FFE include 7 or more taps to achieve 3UI of coverage when a tap interval of 0.5UI is used. Other tap constraints may define a minimum number of precursor taps such as at least two precursor taps. When two precursor taps and seven total taps are defined, the resulting digital filter is asymmetric with respect to the number of remaining taps on the opposing or post-cursor side of the reference tap. Still another tap constraint may include a comparison of a pulse spread of a received signal with a function of the number of taps and a fractional unit interval to ensure that the taps are located to cover at least the spread of the received signal. Another tap constraint may include a minimum tap coverage of at least an integer multiple of the UI of the received signal.

The one or more coefficient constraints will identify a unity coefficient value in association with the reference tap. The coefficient constraints may further include ensuring that the sign associated with the coefficient values for adjacent taps to the reference tap is positive. In addition, the coefficient constraints may also include a range for a sum of all coefficient values for coefficients associated with taps other than the reference tap. For example, the range for the sum of coefficient values applied to the taps other than the reference tap is from about 0.8 to about 1.2.

Figure 4:
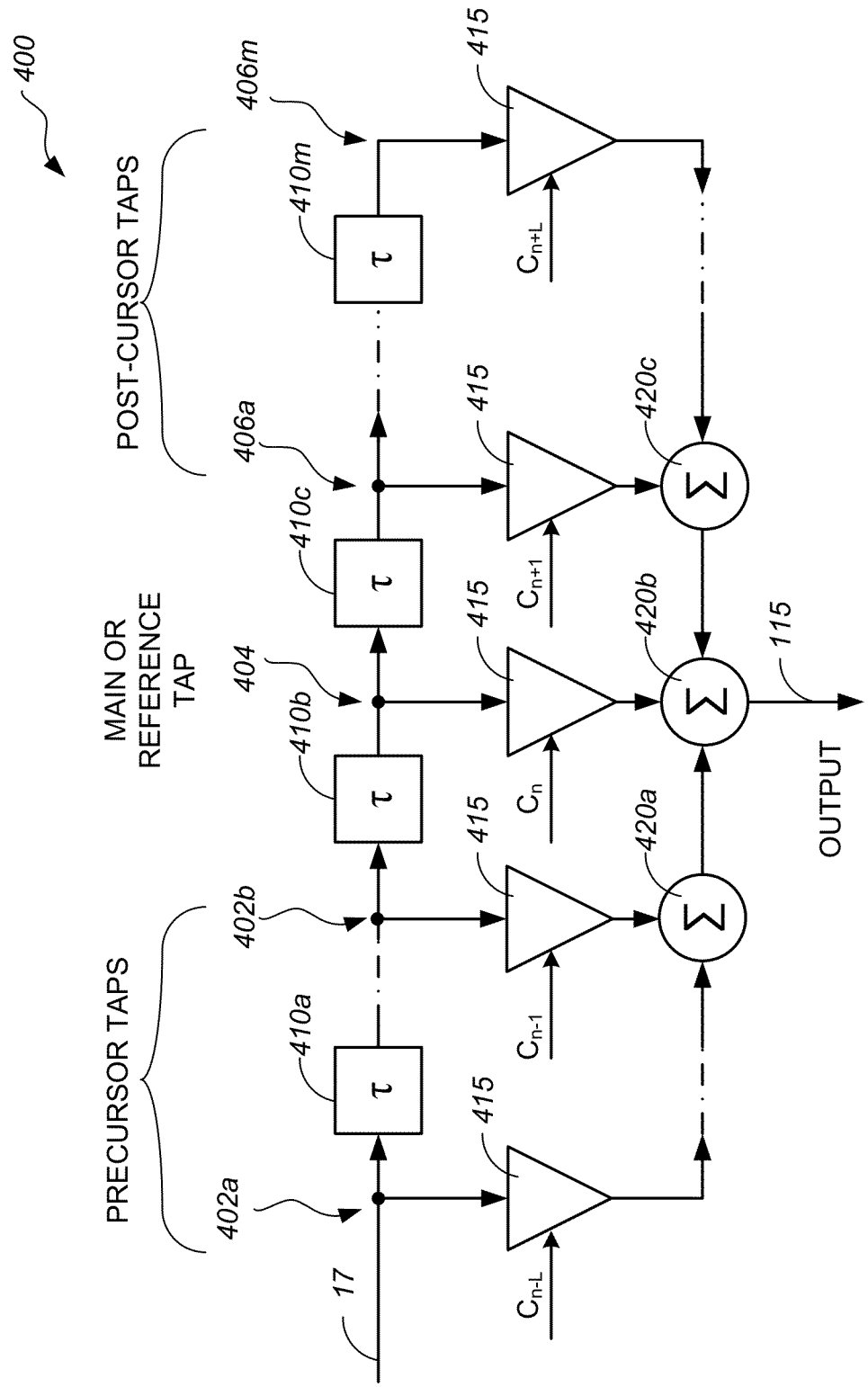
FIG. 4 illustrates a block diagram of an embodiment of a multiple-tap feed-forward equalizer of the dispersion compensation circuit of FIG. 3.

FIG. 4 illustrates a block diagram of an embodiment of the multiple-tap feed-forward equalizer (M-tap FFE) 400. A time-varying signal is received on connection 17 and is applied at each instance of the precursor taps 402, the main or reference tap 404, and each instance of the post-cursor taps 406. As indicated, all but the first of the precursor taps 402 and the last of the post-cursor taps 406 have a delay element 410 both before and after the tap. The delay elements 410 may each provide a similar delay in the received signal having a duration that is a fraction of the unit interval of the received data signal. Each of the precursor taps 402, the main or reference tap 404 and the post-cursor taps 406 is coupled to a respective variable gain amplifier 415 that adjusts the magnitude of the received signal at its input in accordance with a coefficient value provided at a respective control input. The respective outputs generated by the variable gain amplifiers 415 are forwarded to adders 420 with adder 420b arranged to provide the sum of all weighted tap outputs on connection 115.

As indicated in FIG. 4, a coefficient value corresponding to tap location $C_{n-L}$ is provided at the control input of the variable gain amplifier arranged to receive the input signal without delay, where L is a positive integer and the total number of taps is 2L+1. Similarly, a coefficient value corresponding to $C_{n-1}$ is provided at the control input of the variable gain amplifier arranged to receive the delayed receive signal from the precursor tap adjacent to the main tap 404. A coefficient value corresponding to the main or reference tap location $C_n$ is provided at the control input of the variable gain amplifier arranged to receive the delayed receive signal from the main tap 404. A coefficient value corresponding to $C_{n+1}$ is provided at the control input of the variable gain amplifier arranged to receive the delayed receive signal from the post-cursor tap adjacent to the main tap 404. A coefficient value corresponding to tap location $C_{n+L}$ is provided at the control input of the variable gain amplifier arranged to receive the input signal after being delayed by all delay elements 410a-410m. Where M is a positive integer indicative of the number of taps in the M-Tap FFE 400.

As further indicated, the M-Tap FFE 400 includes at least two precursor taps, which are arranged before the main or reference tap 404. In addition, the M-Tap FFE 400 includes at least two post-cursor taps, which follow the main or reference tap 404. In the illustrated embodiment, there are additional precursor taps 402 and post-cursor taps 406 with corresponding variable gain amplifiers, coefficient inputs and adders 420 arranged to provide the sum of tap outputs at an input of an adder 420b. The M-Tap FFE 400 is a symmetric digital filter as there are L precursor taps and L post-cursor taps.

Figure 5:
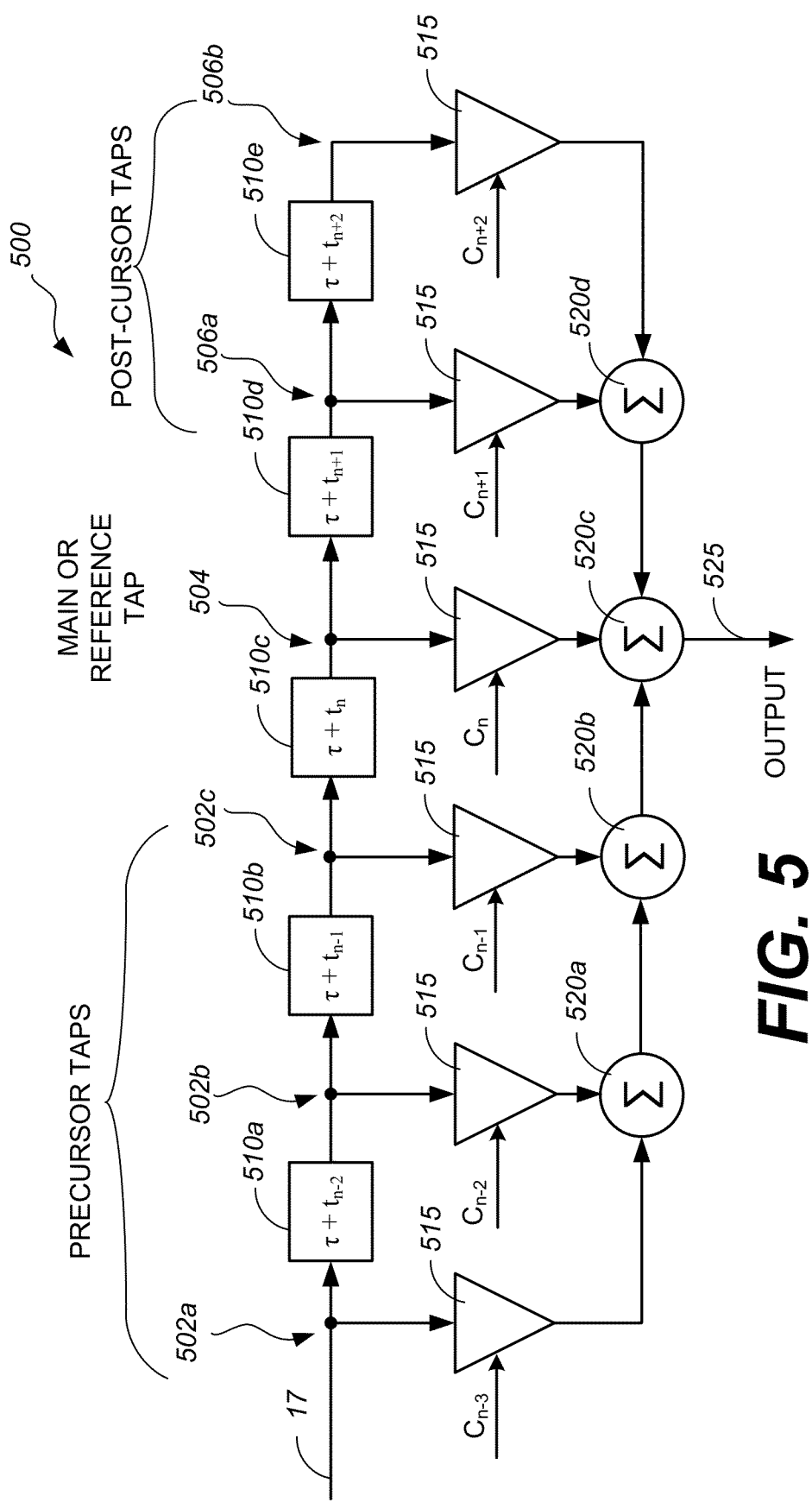
FIG. 5 illustrates an alternative embodiment of a multiple-tap feed-forward equalizer of the dispersion compensation circuit of FIG. 3.

FIG. 5 illustrates an alternative embodiment of the M-Tap FFE 500. A time-varying signal is received on connection 17 and is applied at each instance of the precursor taps 502, the main or reference tap 504, and each instance of the post-cursor taps 506. As indicated, all but the first of the precursor taps 502 and the last of the post-cursor taps 506 have a delay element 510 both before and after the tap. The delay elements 510a-510e may each provide a different delay in the received signal having a duration that is a fraction of the unit interval of the received data signal. Each of the precursor taps 502, the main or reference tap 504 and the post-cursor taps 506 is coupled to a respective variable gain amplifier 515 that adjusts the magnitude of the received signal at its input in accordance with a coefficient value provided at a respective control input. The respective outputs generated by the variable gain amplifiers 515 are forwarded to adders 520 with adder 520c arranged to provide the sum of all weighted tap outputs on connection 525.

As indicated in FIG. 5, a coefficient value corresponding to tap location $C_{n-3}$ is provided at the control input of the variable gain amplifier arranged to receive the input signal without delay. Similarly, a coefficient value corresponding to $C_{n-2}$ is provided at the control input of the variable gain amplifier arranged to receive the delayed receive signal from the precursor tap next closest to the main tap 504. A coefficient value corresponding to $C_{n-1}$ is provided at the control input of the variable gain amplifier arranged to receive the delayed receive signal from the precursor tap adjacent to the main tap 504. A coefficient value corresponding to the main or reference tap location $C_n$ is provided at the control input of the variable gain amplifier arranged to receive the delayed receive signal from the main tap 504. A coefficient value corresponding to $C_{n+1}$ is provided at the control input of the variable gain amplifier arranged to receive the delayed receive signal from the post-cursor tap adjacent to the main tap 504. A coefficient value corresponding to tap location $C_{n+2}$ is provided at the control input of the variable gain amplifier arranged to receive the input signal after being delayed by all delay elements 510a-510e. As shown, the M-Tap FFE 500 is an asymmetric digital filter consisting of six total taps.

As further indicated in FIG. 5, each of the delay elements 510 may be implemented as a combination of a similar fixed delay, τ, and a controllable additive delay $t_n$. As indicated in FIG. 5, each of the controllable delays may be adjusted so that the total delay prior to a tap can be adjusted as may be desired. For example, the delay introduced by delay element 510a is the sum of τ and $t_{n-2}$, the delay introduced by delay element 510b is the sum of τ and $t_{n-1}$, the delay introduced by delay element 510c is the sum of τ and $t_n$, etc. A controllable delay element can be implemented electrically by varying one or more characteristics of a resistor, a capacitor or elements that exhibit electrical resistance or capacitance. The present controller and methods are not limited to any particular mechanism for controllably introducing a variable delay in a received signal.

In an alternative embodiment (not shown), each of the delay elements 510 may be implemented as a controllable delay $t_n$ only. Either implementation will enable a tap delay or tap location adjustment to controllably manipulate a fractional unit interval between adjacent taps in a digital filter. Such tap delay or tap location adjustments can be applied to taps adjacent to a main or reference tap or another defined tap or taps.

Figure 6A:
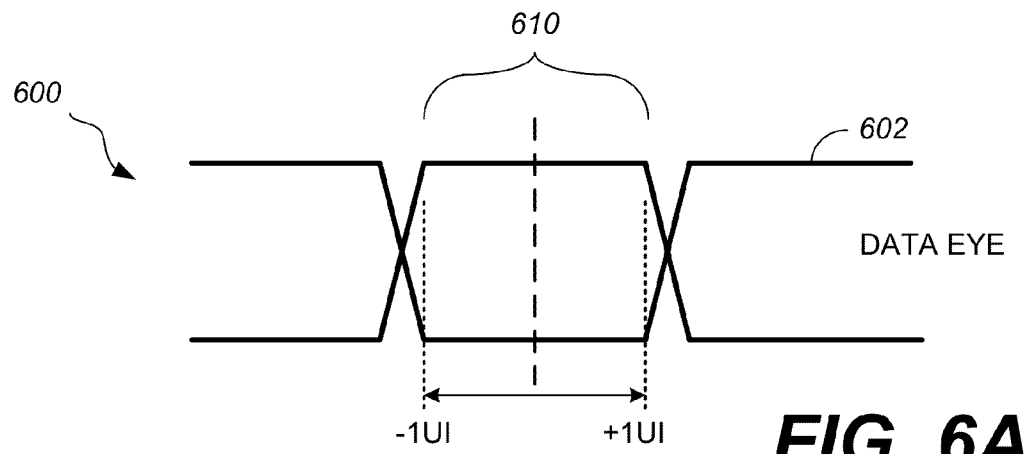
FIG. 6A includes an embodiment of an eye diagram after equalization with the dispersion compensation circuit of FIG. 3.

FIG. 6A includes an embodiment of an eye diagram 600 after equalization with the dispersion compensation circuit 400 of FIG. 3. Signal trace 602 corresponds to a superposition of samples of a received serial data signal over 1UI of the transmitted data signal. Accordingly, the signal trace 602 shows a pulse spread 610 of 1UI or +/-0.5UI. A total tap coverage, defined as the product of the tap spacing and a total number of taps minus 1, should stretch to at least the pulse spread of the received signal. For communications links using optical media, a total tap coverage of at least 3UI is preferred. In addition to these tap constraints, additional constraints do not excessively reduce signal amplitude while reducing ISI. It is preferred that the sum of the penalty caused by the residual ISI and the noise enhancement penalty should be minimized. This function (i.e., the sum of residual ISI and the noise enhancement penalty) is more closely associated with communication link performance than the conventional method of forcing the residual ISI to zero.

With fractional UI tap spacing, the coefficient value for the taps adjacent to the main or reference tap can be positive. This will increase the amplitude of the signal. Thus, reducing the penalty introduced in the conventional method, which significantly reduces signal amplitude. The coefficient values and the signs associated with the remaining taps can be used to close or minimize the residual ISI. It is proposed that the sum of all coefficient values, normalized by the main tap, be set to a value that is not far from unity. For example, the total range for the sum of coefficient values could be from about 0.8 to 1.2. In this way, the amplitude of the equalized signal is not far from the original signal value. Within these constraints, the coefficient values applied to the taps (other than the reference tap) can be manipulated to minimize ISI. These additional constraints can be implemented using digital control logic, discrete logic elements, an application specific integrated circuit, and others using means square error as the figure of merit. This approach is not only advantageous in that it reduces the space that a algorithm has to cover to identify a global minimum of the sum of the residual ISI and the noise enhancement penalty, the approach will also avoid local minimums that might not define the best available communication link performance.

Figure 6B:
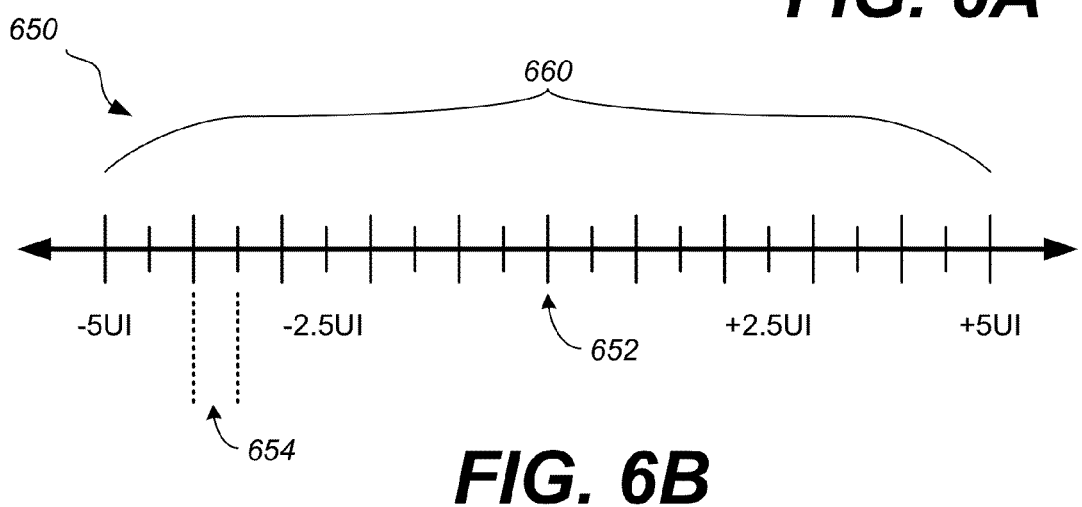
FIGS. 6B and 6C illustrate alternative embodiments of example tap locations generated by the controller of FIG. 3.
Figure 6C:
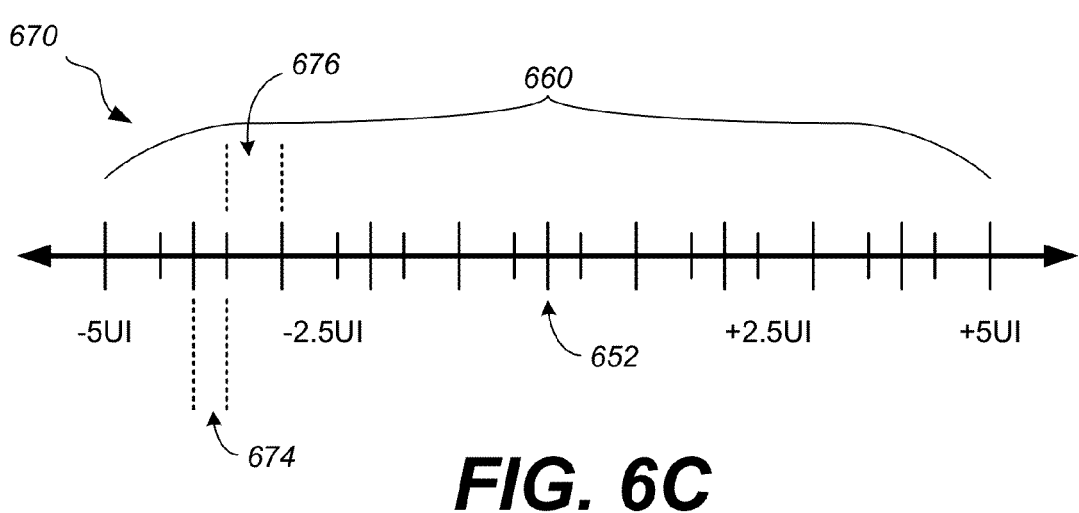

FIGS. 6B and 6C illustrate alternative embodiments of example tap locations generated by the controller 300 of FIG. 3. For example, in FIG. 6B plot 650 defines a digital filter having a main or reference tap at location 652, a fixed fractional UI 654 of 0.5, and a total tap coverage 660 across a total of 21 taps. It should be understood that plot 650 is presented as an example configuration. Improvements can be shown for a digital filter having 7 total taps with a fractional UI of 0.5 between adjacent taps. Alternative delays (i.e., tap interval) ranging from about 0.3UI to about 0.7UI are contemplated and would also achieve desirable results.

For example, in the prior art case, as discussed in the background section, the FFE using 3 taps total with the taps spaced 1UI from each other, results in a total center of eye penalty after equalization of 1.75 dB, yielding a relatively small gain of about 0.85 dB.

In contrast, using the above described 7 tap filter with a fractional UI of 0.5, and the additional coefficient constraints, the coefficient values are optimized at about 0.09, -0.45, 0.36, 1.0, 0.36, -0.45, 0.09. The total penalty is 1.1 dB in noise enhancement, leading to a 1.5 dB penalty reduction.

Some additional optical waveforms were processed through a 7 tap filter using the same fractional UI of 0.5 between adjacent taps. For example, a first waveform with an original vertical closure penalty of 2.2 was provided to the improved dispersion compensation circuit 110. After equalization using the proposed method, the coefficient values are 0.04, -0.31, 0.27, 1, 0.27, -0.32, 0.04. The residual ISI was 0.39 dB. The increased noise penalty from the additional signal is 0.63 dB. The total remaining penalty is 1.02 dB, resulting in a penalty reduction of 1.18 dB. When this same waveform is processed using the prior art 3 tap approach of minimizing ISI, the tap coefficient values are about -0.12, 1, -0.12. The signal amplitude is reduced to about 0.76, resulting in a net penalty reduction of only 0.58 dB.

By way of further example, a second waveform with an original vertical closure penalty of 3.3 was provided to the improved dispersion compensation circuit 110. After equalization using the proposed method, the coefficient values are 0.04, -0.31, 0.27, 1, 0.27, -0.32, 0.04. The residual ISI was 1.09 dB. The increased noise penalty from the additional signal is 0.63 dB. The total remaining penalty is 1.72 dB, resulting in a penalty reduction of 1.61 dB. When this same waveform is processed using the prior art 3 tap approach of minimizing ISI, the tap coefficient values are about -0.16, 1, -0.16. The signal amplitude is reduced to about 0.68, resulting in a net penalty reduction of only 0.86 dB.

In still another example, a third waveform with an original vertical closure penalty of 4.1 was provided to the improved dispersion compensation circuit 110. After equalization using the proposed method, the coefficient values are 0.08, -0.48, 0.40, 1, 0.40, -0.48, 0.08. The residual ISI was 0.69 dB. The increased noise penalty from the additional signal is 1.28 dB. The total remaining penalty is 1.97 dB, resulting in a penalty reduction of 2.1 dB. When this same waveform is processed using the prior art 3 tap approach of minimizing ISI, the tap coefficient values are about −0.20, 1, −0.20. The signal amplitude is reduced to about 0.68, resulting in a net penalty reduction of only 1.36 dB.

Plot 670 (FIG. 6C) defines a digital filter having a main or reference tap at location 652, a total tap coverage 660 of +/−5UI using a total of 21 taps with variable fractional UI delays. A first tap separation of a first fractional UI 674 is defined between the reference tap and the adjacent taps. This first fractional UI 674 is defined between the third taps and the fourth taps, between the fourth taps and the fifth taps and again between the seventh taps and the eighth taps and the eighth taps and the ninth taps from the reference tap 652. A second tap separation of a second fractional UI 676 is defined between the first taps and the second taps and the second taps and the third taps and again between the fifth taps and the sixth taps and between the sixth taps and the seventh taps from the reference tap 652. The second fractional UI 676 is wider (i.e., longer in time) than the first fractional UI 674. This second fractional UI 676 can be accomplished by applying a correspondingly longer delay line between adjacent taps. It should be understood that other tap placements are possible by varying the time delay between the taps of the digital filter. It should be understood that plot 670 is presented as an example configuration.

It has been determined that the combination of a fixed fractional UI tap spacing between the reference tap and the same polarity taps adjacent to the reference tap causes a bandwidth reduction in the received signal, which is contrary to the purpose of the dispersion compensation circuit 100. When the time delay of the adjacent taps to the reference tap is reduced, the bandwidth reduction is also reduced, thereby increasing the performance of the dispersion compensation circuit 100. It has been further determined that by varying the negative tap weight across two taps spaced from each other with a tap delay of about 0.1 to 0.2UI it is possible to adjust tap delays and vary coefficient values associated with the same taps to achieve the same eye opening, while reducing the noise enhancement effect from that same coefficient value or weight by the root of 2. With this additional flexibility, the residual ISI can also be reduced, thus further improving the overall link performance.

Figure 7A:
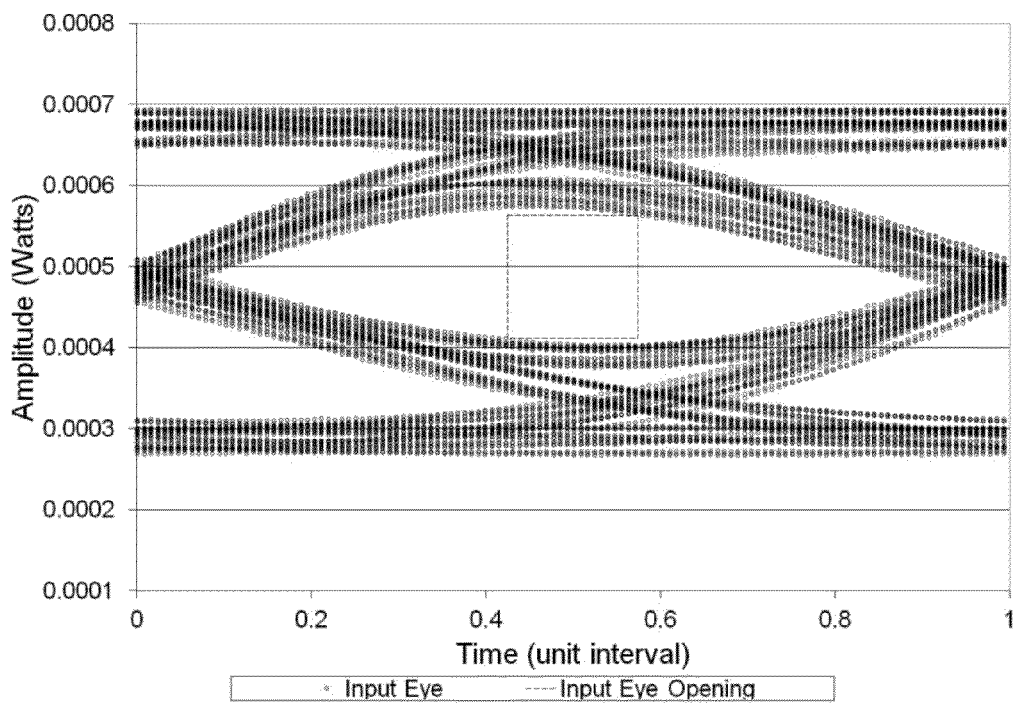
FIGS. 7A and 7B illustrate an example comparison of an eye diagram of a received signal (an input eye) and an equalized signal (equalized eye) using an embodiment of a configured dispersion compensation circuit in accordance with defined tap and coefficient value constraints.
Figure 7B:
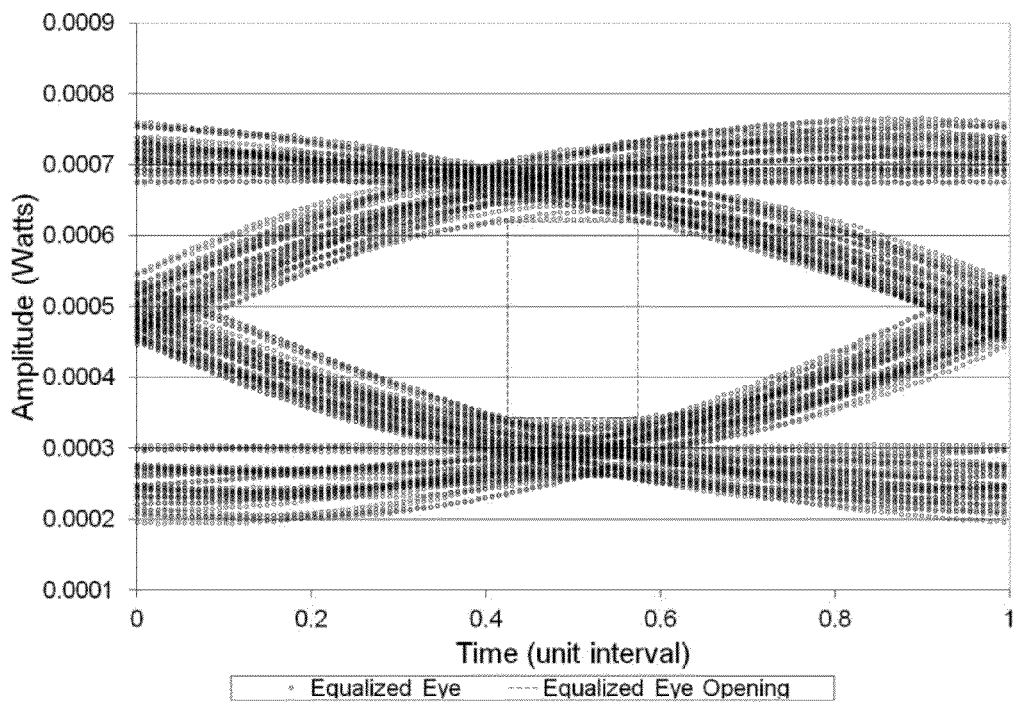

For example, Table I shows a first simulation using fixed delays between filter taps relative to the main or reference tap and variable coefficient values or weights for each of the taps. The coefficient values were optimized to achieve a relatively flat center eye opening of about 0.15UI. When a waveform with an initial ISI of 4.0 dB is applied to the filter and equalized using the described modification to the proposed method, the coefficient values are 0.015, −0.372, 0.340, 1, 0.233, −0.257, 0.041. The residual ISI was 1.4 dB. The increased noise penalty from the additional signal is 0.7 dB. The resulting net gain in the link budget is 1.9 dB. FIG. 7A includes a plot illustrating an original (non-equalized) eye diagram. FIG. 7B includes a plot showing the resulting equalized eye diagram when the equalizer is configured with the tap delays and coefficient values from Table I.

TABLE I

| | Tap Delays | | | | | | |
|---|---|---|---|---|---|---|---|
| | −1.50 | −1.00 | −0.50 | 0.00 | 0.50 | 1.00 | 1.50 |
| Coefficient Value | 0.015 | −0.372 | 0.340 | 1.00 | 0.233 | −0.257 | 0.041 |

Figure 8A:
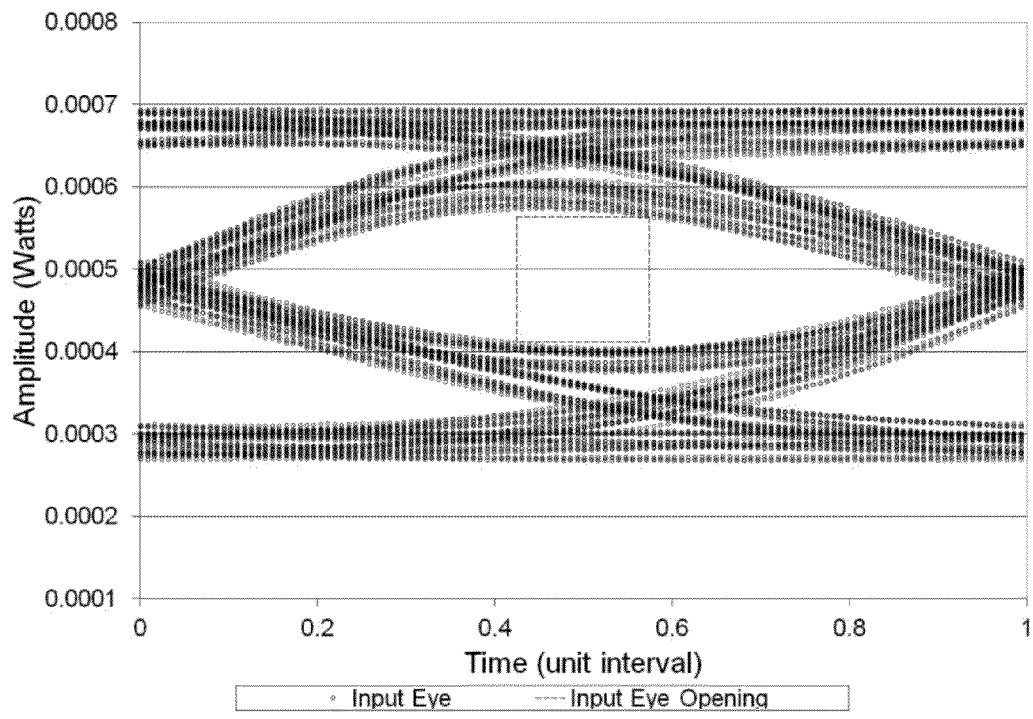
FIGS. 8A and 8B illustrate an example comparison of an input eye diagram and an equalized eye using an alternative embodiment of a configured dispersion compensation circuit in accordance with defined tap and coefficient value constraints.
Figure 8B:
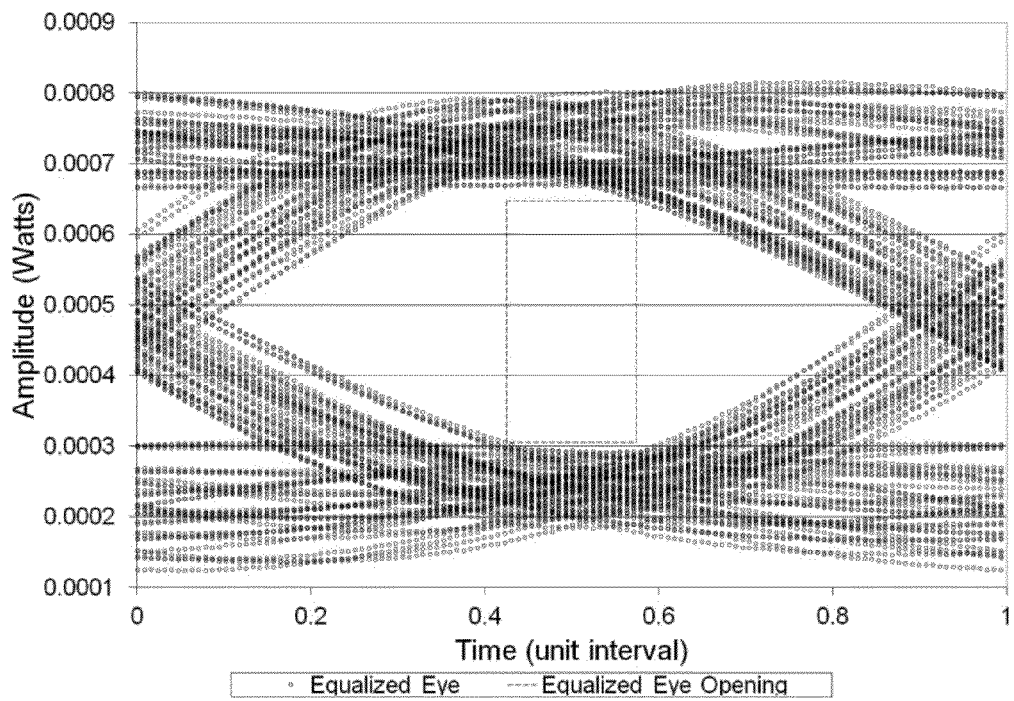

By way of further example, Table II shows a second simulation using variable tap delays relative to the distance from the main or reference tap and variable coefficient values or weights for each of the taps. The coefficient values were optimized to achieve a relatively flat center eye opening of about 0.15UI. When a waveform with an initial ISI of 4.0 dB is applied to the filter and equalized using the described modification to the proposed method, the coefficient values are −0.199, −0.223, 0.360, 1, 0.360, −0.158, −0.140. The residual ISI was 0.47 dB. The increased noise penalty from the additional signal is 0.72 dB. The resulting net gain in the link budget is 2.77 dB. FIG. 8A includes a plot illustrating an original (non-equalized) eye diagram. FIG. 8B includes a plot showing the resulting equalized eye diagram when the equalizer is configured with the tap delays and coefficient values from Table II.

TABLE II

| | Tap Delays | | | | | | |
|---|---|---|---|---|---|---|---|
| | −1.05 | −0.95 | −0.10 | 0.00 | 0.10 | 0.95 | 1.05 |
| Coefficient Value | −0.199 | −0.223 | 0.360 | 1.00 | 0.360 | −0.158 | −0.140 |

Figure 9:
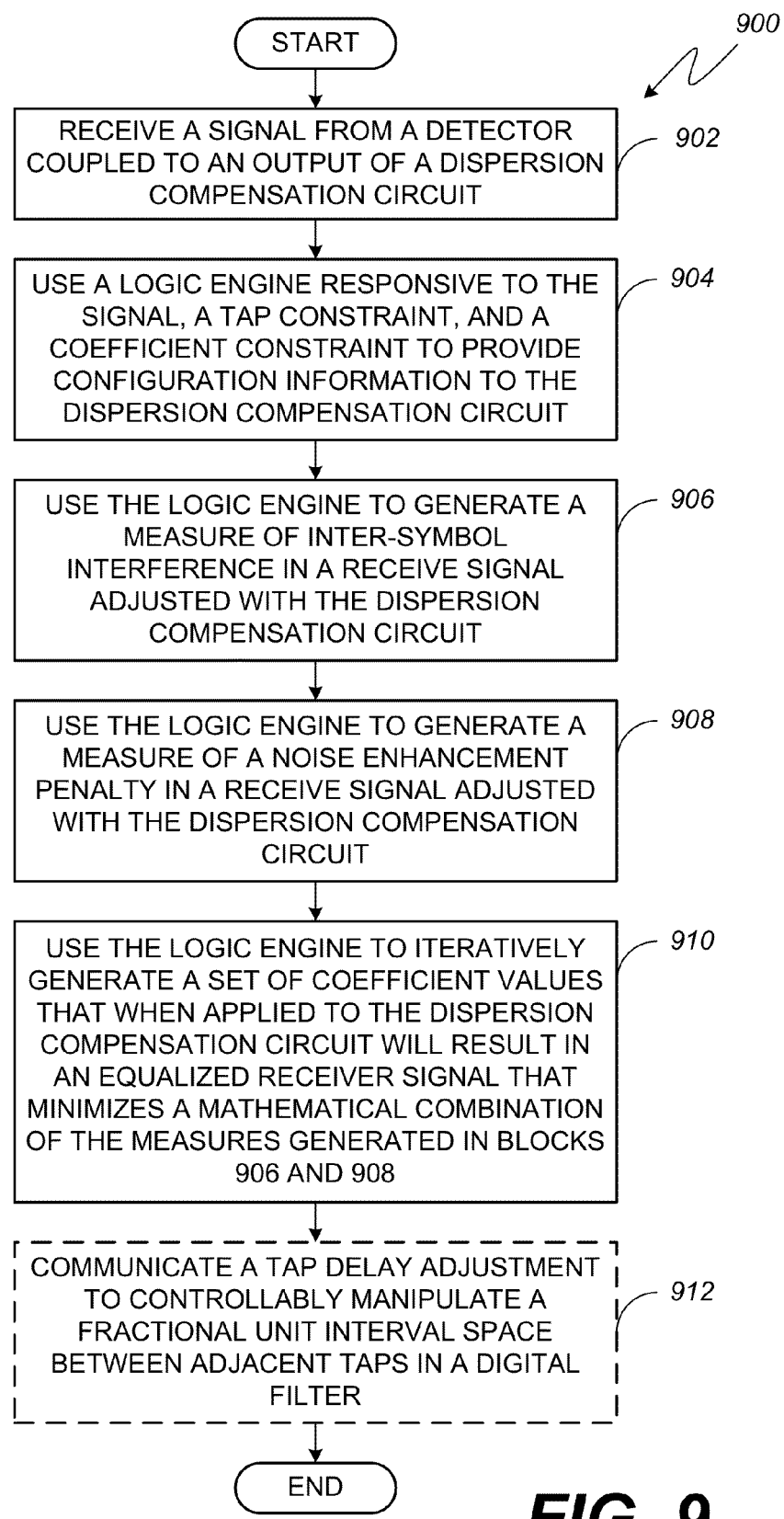
FIG. 9 illustrates a flow diagram of an embodiment of a method for equalizing a received serial data signal.

As an example of implementation, FIG. 9 illustrates a flow diagram of an embodiment of a method 900 for equalizing a received serial data signal. The method 900 begins with block 902 where a signal is received from a detector coupled to an output of a dispersion compensation circuit. The signal may be a sampled representation of the output of the dispersion compensation circuit or may be an output from any number of circuits that generate an electrical signal indicative of the quality of the signal at the output of the dispersion compensation circuit. These circuits can include an error detection or error correction circuit, an eye monitor circuit, a mean square error detector, a signal spectrum monitor. The arrangements and operating description of these well known signal quality detectors are incorporated by reference and are understood by those skilled in art.

Thereafter, as indicated in block 904 a logic engine responsive to the signal a tap constraint and a coefficient constraint is used to provide configuration information to the dispersion compensation circuit. A tap constraint may include one or more of a minimum number of taps, a tap separation between adjacent taps, a total tap coverage or range of fractional UI spaces between adjacent taps, a minimum number of precursor taps, a location of a main or reference tap, and a comparison of a pulse spread of a received signal with a function of a number of taps and a fractional UI between adjacent taps. A coefficient constraint may include one or more of ensuring that a sign associated with adjacent taps to a reference tap is positive, a range for the sum of all coefficient values (e.g., from about 0.8 to 1.2), a predetermined value for a reference or main tap (e.g., the real number 1.0), and a predetermined set of coefficient values for application to be applied under defined circumstances.

In block 906, the logic engine or alternatively a dedicated circuit or processor is used to generate a measure of the ISI in a receive signal processed by the dispersion compensation circuit. In block 908, the logic engine or alternatively a dedicated circuit or processor is used to generate a measure of a noise enhancement penalty in a receive signal processed by the dispersion compensation circuit. Thereafter, as indicated in block 910, the logic engine iteratively generates a set of coefficient values that when applied to the dispersion compensation circuit (e.g., to the taps of a FFE digital filter) will result in an equalized receiver signal that minimizes a mathematical combination of the ISI and the noise enhancement penalty as measured in block 906 and in block 908, respectively. As further indicated in optional block 912, a tap delay adjustment is communicated to dispersion compensation circuit to controllably manipulate a fractional UI between adjacent taps in a digital filter.

Figure 10:
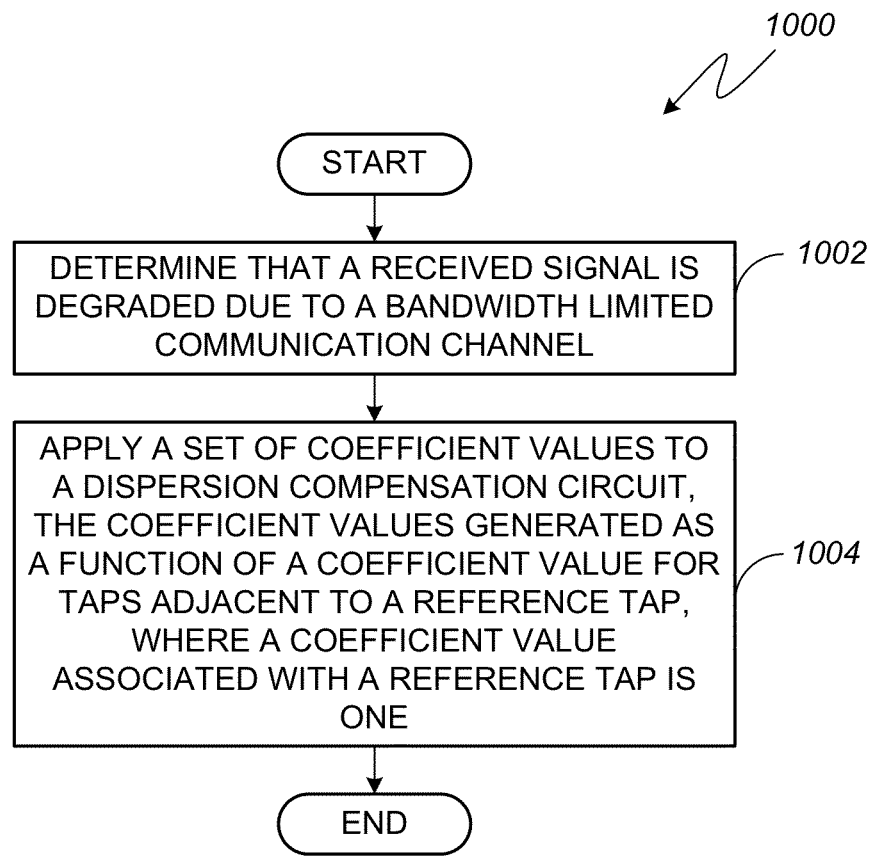
FIG. 10 illustrates a flow diagram of an embodiment of an alternative method for equalizing a received serial data signal.

FIG. 10 illustrates a flow diagram of an embodiment of an alternative method 1000 for equalizing a received serial data signal. The method 1000 begins with block 1002 where it is determined that a received signal is degraded due to a bandwidth limited communication channel. As indicated, a bandwidth limited communication channel will typically exhibit a symmetrical eye diagram. Thus, one or more measures of symmetry of the eye diagram as produced by an eye monitor may be used to determine when a received signal is degraded due to transmission via a bandwidth limited communication channel.

Thereafter, in block 1004, a set of coefficient values are applied to a dispersion compensation circuit such as the digital filter illustrated in FIG. 4. As indicated in block 1004 the coefficient values are a function of a coefficient value for taps adjacent to a reference tap of the digital filter and the coefficient value for the reference tap is the real number one.

A further implementation is possible for bandwidth limited waveforms. When signal degradation in a receiver is purely due to bandwidth limitation, the resulting eye diagram is symmetric. Thus, the coefficient values will be symmetric as well. Since coefficient values near +/−1UI need to be negative and the coefficient values associated with taps adjacent to the reference tap need to be positive, a possible set of coefficient values could be:

$$C(-3)=C(3)=C(-2)=C(2)=0.5*C(-1); C(-1)=C(1)$$

As a result, the coefficient values are more or less well defined and the optimization can focus on selecting an appropriate coefficient value to associate with the first tap or C(1). FIG. 11 includes a table that compares simulation results for five received waveforms with varying initial ISI values ranging from about 2-5 dB where C(1)=0.38, the gain in link budget is very close to the equalization results when all tap coefficient values are variables (i.e., a full optimization). The table includes three measures for three alternative configurations of a dispersion compensation circuit 100. The first of the alternative configurations reveals a residual ISI, a net error figure (NEF), and net signal gain for the case where each of the coefficient values is optimized. The second of the alternative configurations reveals the residual ISI, NEF and the net signal gain for the case where the tap coefficient value for the adjacent tap to the reference tap is fixed at 0.377. The third of the alternative configurations reveals the same measures for the case where the tap coefficient value for the adjacent tap to the reference tap is optimized.

While the controller and methods for equalizing a received serial data signal have been described in association with the illustrated embodiments, those skilled in the art will understand that a variety of logical configurations may be used for this purpose. Thus, the controller and methods for equalizing a received serial data signal are not limited to the described embodiments.

What is claimed is:

1. A controller for adaptively adjusting a dispersion compensation circuit in a receiver of a communication link, comprising:
a first interface for receiving a signal from an error detector responsive to an output of the dispersion compensation circuit; and
a logic engine coupled to the first interface and arranged to provide configuration information to the dispersion compensation circuit, the configuration information defining a digital filter in response to a tap constraint and a coefficient constraint, the logic engine further arranged to generate a measure of residual inter-symbol interference and a measure of noise enhancement penalty and iteratively generating a set of adjusted coefficient values that when applied in the digital filter will result in an equalized receiver output signal that minimizes a mathematical combination of the measure of the residual inter-symbol interference and the measure of the noise enhancement penalty, wherein the noise enhancement penalty is a function of an original noise prior to the dispersion compensation circuit and a square root of a sum of a set of ratios of the tap weights of non-reference taps divided by the tap weight of a reference tap where the set of ratios is squared.

2. The controller of claim 1, wherein the tap constraint includes a minimum number of taps in the defined digital filter.

3. The controller of claim 1, wherein the tap constraint includes a fractional unit interval space between adjacent taps in the defined digital filter.

4. The controller of claim 3, wherein the tap constraint includes a range of fractional unit interval spaces between adjacent taps in the defined digital filter.

5. The controller of claim 4, wherein the range of fractional unit interval spaces between adjacent taps is fixed with a value in the range of 0.3 to 0.7.

6. The controller of claim 1, wherein the tap constraint includes at least two precursor taps in the defined digital filter.

7. The controller of claim 1, wherein the tap constraint includes a location of a reference tap in the digital filter.

8. The controller of claim 7, wherein the location of the reference tap in the digital filter is asymmetric with respect to remaining taps.

9. The controller of claim 1, wherein the tap constraint is responsive to a comparison of a pulse spread of a received signal with a function of the number of taps and a fractional unit interval space between adjacent taps.

10. The controller of claim 9, wherein the comparison confirms that the result of the function is at least as wide as the pulse spread of the received signal.

11. The controller of claim 1, wherein the tap constraint includes a tap spread of at least 3 unit intervals.

12. The controller of claim 1, wherein the coefficient constraint includes ensuring that a sign associated with a coefficient value for adjacent taps to a reference tap is positive.

13. The controller of claim 1, wherein the coefficient constraint includes a range for a sum of coefficient values.

14. The controller of claim 13, wherein the range for the sum of coefficient values is from 0.8 to 1.2.

15. A method for adaptively equalizing a received serial data stream processed by a dispersion compensation circuit, the method comprising:
receiving a signal from a detector responsive to an output of the dispersion compensation circuit;
using a logic engine responsive to the signal from the error detector, a tap constraint, and a coefficient constraint, to generate and provide configuration information to the dispersion compensation circuit;
using the logic engine to generate a measure of residue inter-symbol interference in a receive signal adjusted with the dispersion compensation circuit;
using the logic engine to generate a measure of noise enhancement penalty in the receive signal adjusted with the dispersion compensation circuit, wherein the noise enhancement penalty is a function of an original noise in a received serial data stream before adaptive equalization by the dispersion compensation circuit and a square root of a sum of a set of ratios of the tap weights of non-reference taps divided by the tap weight of a reference tap where the set of ratios is squared; and iteratively generating a set of adjusted coefficient values that when applied in the dispersion compensation circuit will result in an equalized receiver output signal that minimizes a mathematical combination of the measure of the residue inter-symbol interference and the measure of the noise enhancement penalty.

16. The method of claim 15, wherein the tap constraint includes a fractional unit interval space between adjacent taps in a digital filter.

17. The method of claim 15, further comprising:
forwarding a tap delay adjustment to controllably manipulate a fractional unit interval space between adjacent taps in a digital filter.

18. The method of claim 17, wherein the tap delay adjustment is applied to taps adjacent to a reference tap.

19. A method for equalizing a received serial data stream processed by a dispersion compensation circuit, the method comprising:

determining that a received signal is degraded due to a bandwidth limited communication channel; and applying a set of coefficient values to the dispersion compensation circuit, the coefficient values generated as a function of a coefficient value for the adjacent taps to a reference tap, wherein a coefficient value associated with the reference tap is one, wherein a sign associated with both adjacent taps is positive.

20. The method of claim 19, wherein the coefficient value for the adjacent taps to the reference tap is in a range of 0.3 to 0.5 and the coefficient value for taps further removed from the reference tap are determined from the product of $-\frac{1}{2}$ and the coefficient value for the adjacent taps.

* * * * *